(12) United States Patent
Knudsen

(10) Patent No.: US 7,457,408 B2
(45) Date of Patent: Nov. 25, 2008

(54) CALCULATION UNIT FOR EXECUTING A CRYPTOGRAPHIC PROTOCOL

(75) Inventor: Erik Knudsen, Paris (FR)

(73) Assignee: Oberthur Technologies, Paris (FR)

( * ) Notice: Subject to any disclaimer, the term of this patent is extended or adjusted under 35 U.S.C. 154(b) by 418 days.

(21) Appl. No.: 09/978,686

(22) Filed: Oct. 18, 2001

(65) Prior Publication Data

US 2002/0061104 A1 May 23, 2002

(30) Foreign Application Priority Data

Oct. 19, 2000 (FR) .................................. 00 13373

(51) Int. Cl.
   *H04L 9/30* (2006.01)
   *H04L 9/22* (2006.01)
(52) U.S. Cl. .......................... 380/28; 380/30
(58) Field of Classification Search .................. 380/28, 380/30; 708/492, 491
   See application file for complete search history.

(56) References Cited

U.S. PATENT DOCUMENTS

| | | | | |
|---|---|---|---|---|
| 5,414,772 A * | 5/1995 | Naccache et al. | ............. | 380/46 |
| 2001/0010077 A1* | 7/2001 | McGregor et al. | .......... | 713/174 |
| 2002/0041681 A1* | 4/2002 | Hoffstein et al. | ............. | 380/28 |
| 2005/0175174 A1* | 8/2005 | Kahl | ......................... | 380/28 |
| 2006/0126830 A1* | 6/2006 | Shimizu | ..................... | 380/28 |

OTHER PUBLICATIONS

Takagi, Naofumi, "A Modular Inversion Hardware Algorithm with a Redundant Binary Representation", Aug. 1993, IEICE Trans. Inf. & Syst., vol. E76-D, No. 8.*
Hastad, J. 1988. Solving simultaneous modular equations of low degree. SIAM J. Comput. 17, 2 (Apr. 1988), 336-341. DOI=http://dx.doi.org/10.1137/0217019.*
D.Naccache et al., "Can D.S.A. be improved ? -Complexity trade-offs with the digital signature standard", In Pre-proceedings of Eurocrypt'94 (1994). http://citeseer.ist.psu.edu/article/naccache95can.html.*
Lenstra, A. K et al.. "On the Security of Lenstra's Variant of DSA without Long Inversions", 2001, In Proceedings of the 4th international Workshop on Practice and theory in Public Key Cryptography: Public Key Cryptography (Feb. 13-15, 2001). K. Kim, Ed. Lecture Notes In Computer Science, vol. 1992. Springer-Verlag, London, 64-72.*
Lenstra A K: "Generating standard DSA signatures without long inversion" Advances in Cryptology—Asiacrypt ' 9A6 International Conference on the Theory and Applications of Cryptology and Information Security, Proceedings, Advances in Cryptology—Asiacrypt' 96, International Conference on the Theory and Applications of Cryp, pp. 57-64,XP002173817.

* cited by examiner

*Primary Examiner*—Matthew Smithers
*Assistant Examiner*—Jeffery Williams
(74) *Attorney, Agent, or Firm*—Browdy and Neimark, P.L.L.C.

(57) ABSTRACT

A calculation unit in which the inverse of an integer modulo a large number is determined provides a series of binary numbers prime with the large number, divides those numbers into two groups at random, and effects the products of the numbers of each group.

11 Claims, 3 Drawing Sheets

CALCULATION UNIT FOR EXECUTING A CRYPTOGRAPHIC PROTOCOL

BACKGROUND OF THE INVENTION

1. Field of the Invention

The invention relates to a calculation unit for executing at least one part of a cryptographic protocol including determining the inverse of an integer modulo a large number.

The invention relates more particularly to means for determining this kind of inverse quickly.

2. Description of the Prior Art

Some cryptographic protocols, for example those known as the Digital Signature Algorithm (DSA) and the Elliptic Curve DSA (ECDSA), have to calculate the inverse of a random integer modulo a large number repetitively. For more details on such protocols see IEEE publication P1363/D13 and especially sections 6.2.7 and 7.2.7 thereof. The aforementioned large number is denoted N in the remainder of this description.

Two numbers are the inverse of each other if their product is identically equal to 1 modulo said large number. For example, the numbers 3 and 5 are the inverse of each other modulo 14. This is because 3×5=15≡1 modulo 14.

One prior art method of performing this calculation is based on the following equation:

$$y = x^{-1} = x^{\phi(N)-1} \quad \text{modulo } N$$

in which $\phi(N)$ is the number of integers prime with N and less than N. This is Euler's "totient" function.

If N is prime, the following simplification is valid:

$$\phi(N) = N-1$$

and consequently:

$$y = x^{-1} = x^{N-2}$$

In binary, this calculation requires 3n/2 multiplications of n×n bits where n=$\log_2$ N, in other words of the order of 160 multiplications in practice.

The invention proposes a faster calculation method in which two numbers that are the inverse of each other modulo N are generated at the same time, by a specific calculation, for example based on a random number.

SUMMARY OF THE INVENTION

To be more precise, the invention provides a calculation unit adapted to execute at least one part of a cryptographic protocol including determining the inverse of an integer modulo a large number, which unit includes:

means for providing a series of binary numbers that are prime with and less than the large number, a number from the series being the inverse of the product of the others modulo the large number, means for dividing all the numbers of the series into two groups at random, and means for effecting the products of the numbers of each group, the results of such products constituting two of the required numbers that are the inverse of each other.

Two numbers are prime to each other if they have no common divisor.

A preferred embodiment of the calculation unit includes:

means for generating a random number, means for representing two of the required numbers initialized to 1 at the beginning of each calculation, means for selecting bits of the random binary number one-by-one and a corresponding number from the series, and means for multiplying the current value of one of the required two numbers by the corresponding number if the bit is equal to 0 or for multiplying the current value of the other of the required two numbers by the corresponding number if the bit is equal to 1, the result of the multiplication constituting the new current value of one or the other of the required two numbers, respectively, and the above operations being effected for all the aforementioned selections, the final current values contained in the means for representing two numbers constituting the required two numbers that are the inverse of each other.

In one embodiment, the means for providing the series of binary numbers include means for storing the numbers constituting that series. Those numbers are precalculated during a preparatory phase that does not have to be executed again each time a pair of numbers that are the inverse of each other modulo N is calculated.

Another embodiment of the means for providing the series include means for generating at least some numbers of the series in real time.

If most of the numbers of the set can be calculated using a fast execution function, time is saved compared to the cited first embodiment in which the numbers are read from a memory.

The precalculation means include means for determining a set of numbers that are prime with the large number, the set constituting numbers of the series, and means for determining the inverse of the product of numbers of the set modulo said large number, the inverse constituting a particular number from the series and completing it.

If all the numbers of the series must be stored, the precalculation means are used once and all the results are stored. On the other hand, if some numbers of the set are obtained by a fast calculation, the precalculation means are used to choose the numbers from the set that can be recalculated each time, based on the use of a fast execution function. It is the choice of numbers from the series that enables an adequate fast execution function to be "found". When that function has been determined and "implemented", it is generally sufficient to store, on the one hand, a number from the set, constituting a point of departure for calculating the other numbers of the set and, on the other hand, the inverse of the product of the numbers of said set (modulo the large number). All the elements are then available that are needed to obtain the numbers of the series, essentially by calculation.

For example, the calculation unit can include storage means containing, on the one hand, the smallest number of the set and, on the other hand, the inverse of the product of the numbers of the set modulo the large number, and the generator means can include means for applying a fast execution function successively, starting from the smallest number, to obtain a succession of numbers constituting the set, the series being formed by the numbers and the inverse.

In a preferred example, the fast execution function obtains each number by adding 1 to the preceding number. This type of fast execution function can be used in particular if the large number is prime. If it is not, it is often possible to find a range of numbers in which all the consecutive numbers are prime with the large number and less than it.

The invention will be better understood and other advantages of the invention will become more clearly apparent in the light of the following description of various embodiments of a calculation unit according to the invention, which

DETAILED DESCRIPTION OF THE PREFERRED EMBODIMENTS

The functioning of the calculation unit defined above is justified by the following demonstration:
Let $S_0$ be the inverse modulo N of the product of a set of k integers $S_1$ to $S_k$ all of which are prime with said large number N and less than N,
Let:

$$S_0 = \left(\prod_{i=1}^{k} S_i\right)^{-1} \text{modulo } N$$

It is shown that $S_0$ is also prime with N.

It is easy to verify that:

$$\prod_{i=1}^{k} S_i \equiv 1 \text{ modulo } N$$

Consequently, if the k+1 numbers $S_i$ of this product are divided at random into two groups of numbers and if the respective products $\Pi_1$ and $\Pi_2$ of the numbers from the two groups are obtained, then the two numbers x and y that result from the products $\Pi_1$ and $\Pi_2$ are the inverse of each other modulo N.

In other words, the basic principle of the invention leads to choosing a number k and a large number N, for example, and then, in a precalculation phase, determining, on the one hand, a set of k numbers $S_1 \ldots S_k$ all less than N and prime with N and, on the other hand, an additional number $S_0$ that constitutes the inverse of the product of the numbers $S_1 \ldots S_k$ modulo N. When this precalculation is effected, a series of k+1 binary numbers is available. These numbers can be stored, for example, to be used whenever necessary, during the execution of a cryptographic calculation to determine two numbers x, y that are the inverse of each other modulo N.

Figure 1:
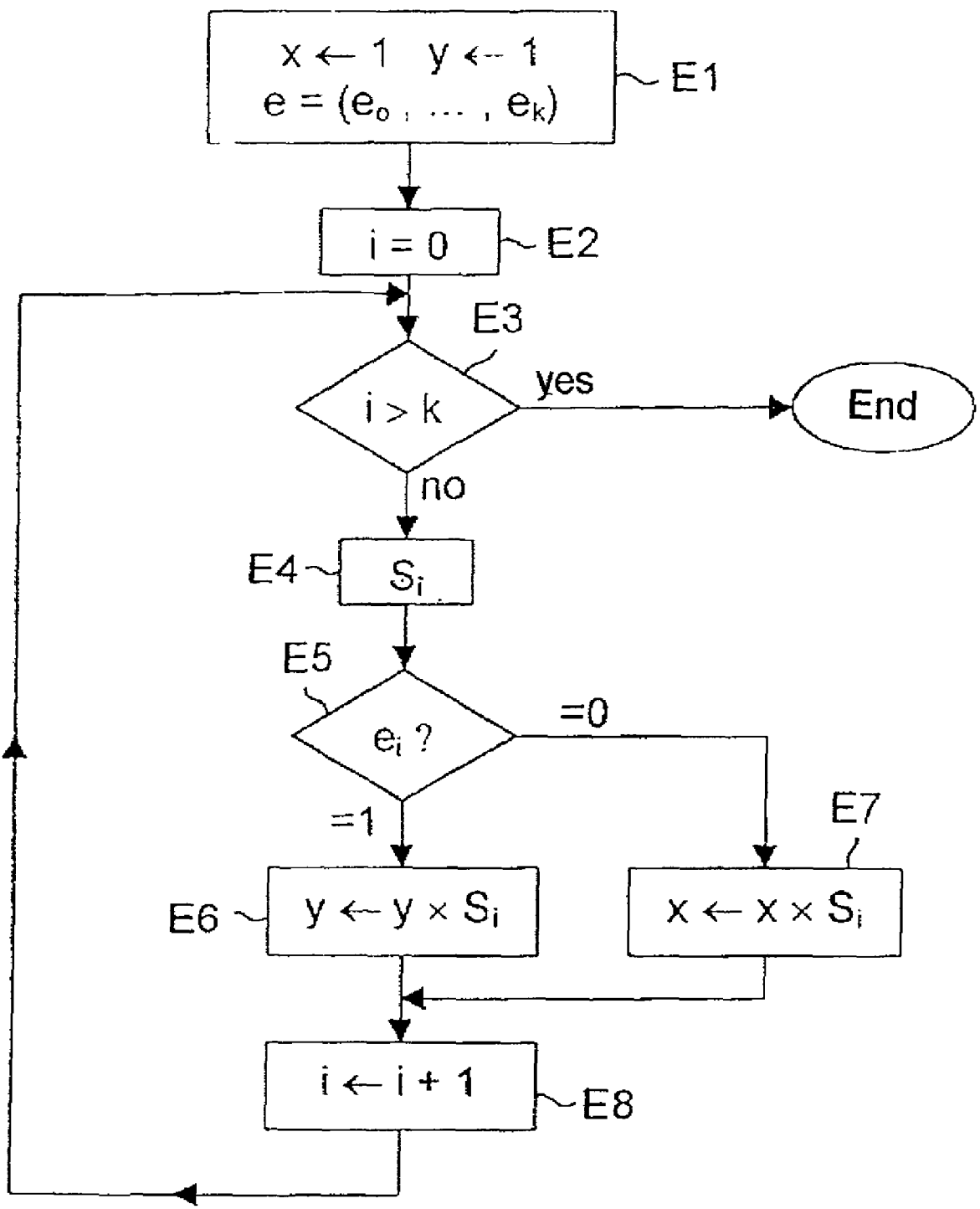
FIG. 1 is a flowchart showing various calculation steps for obtaining two numbers that are the inverse of each other modulo a large number.

The calculation phase proper can proceed in accordance with the FIG. 1 flowchart.

Step $E_1$ is an initialization phase in which two values x and y are initialized to 1 (which is the neutral element of the multiplication).

Also, a binary number e of k+1 bits is chosen at random and is thus made up of k+1 bits ($e_0 \ldots e_k$) each having the value 0 or 1.

Step $E_2$ initializes to 0 a counter i.

Step $E_3$ is a test to verify if the index i is greater than k. A positive test result indicates that the calculation is finished. A negative test results leads on to step $E_5$.

Step $E_4$ "obtains" the number $S_i$. If the numbers $S_i$ are stored, this operation simply consists in reading one of the numbers in a memory. However, as indicated above, it is possible to calculate most of the numbers $S_i$ in real time (with the exception of $S_0$ which is the subject of a particular precalculation). Consequently, step $E_3$ can either read a value in a memory or recalculate it using a "fast execution" function.

Step $E_5$ determines the value of the $i^{th}$ bit of the number e chosen at random. If that bit is equal to 1, the next step is the step $E_6$. If that bit is equal to 0, the next step is the step $E_7$.

Step $E_6$ multiples the number $S_i$ by the preceding value of y and the result becomes the new value of y. The next step is then step $E_8$.

Step $E_7$ multiplies the number $S_i$ by the preceding value of x and the result becomes the new value of x. The next step is step $E_8$.

Step $E_8$ increments i by one unit and returns to step $E_3$ to verify if the index i is greater than k.

If the result of test $E_4$ is positive, the two values x and y represent the required two numbers that are the inverse of each other modulo N.

Figure 2:
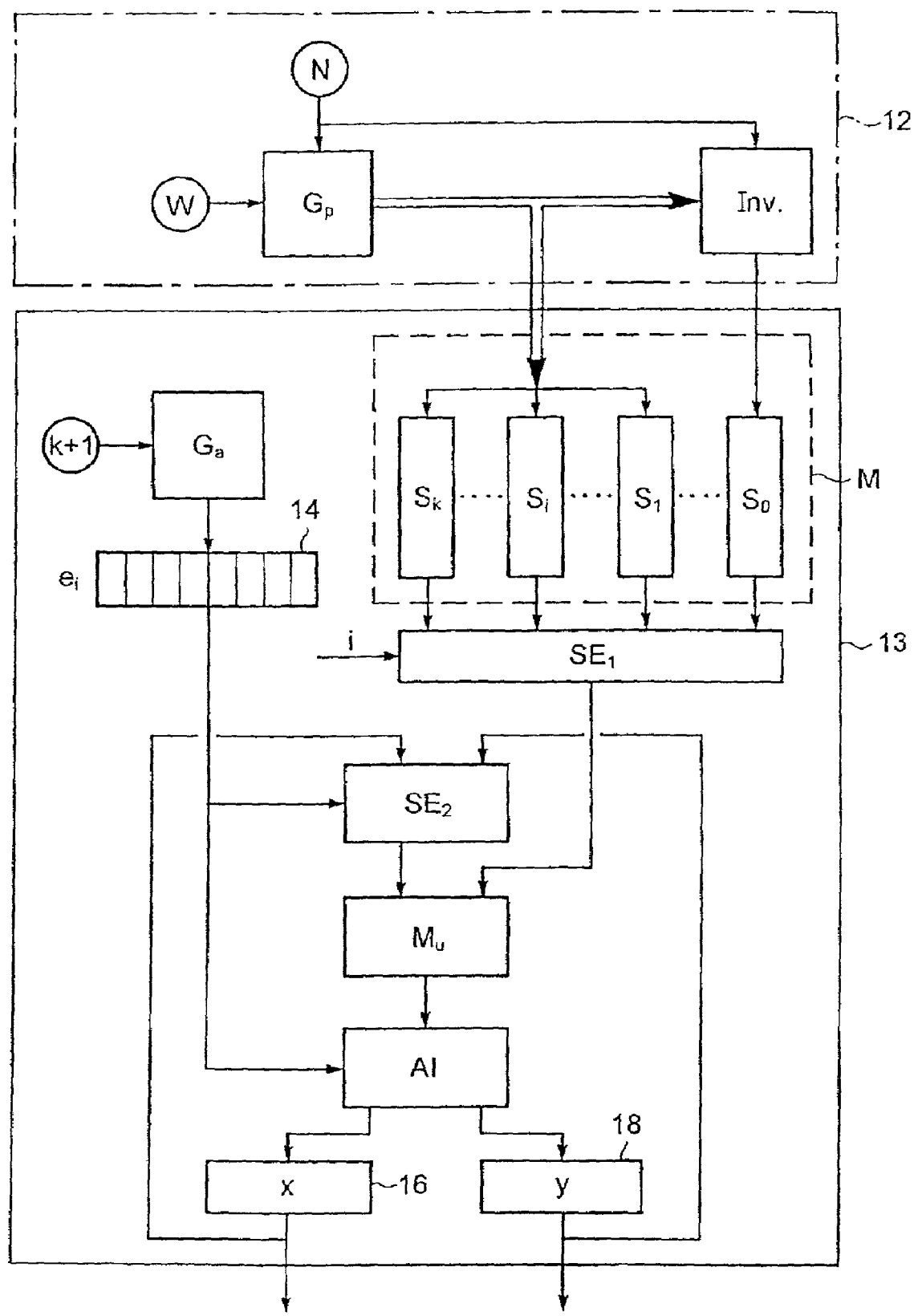
FIG. 2 is a block diagram of a first embodiment of a calculation unit according to the invention.

FIG. 2 is a block diagram showing the means for implementing the algorithm explained by the FIG. 1 flowchart. The block 12 represents the precalculation means and the block 13 represents the calculation means proper.

The precalculation means include a generator Gp for numbers that are prime with said large number N. Those numbers take the form of words on w bits. As the generator Gp generates a succession of numbers prime with N, those numbers $S_1 \ldots S_i \ldots S_k$ are stored in a memory M that is part of the calculation means 13.

In parallel with this, the numbers $S_1$-$S_k$ are sent to a circuit Inv which calculates the number $S_0$. The number $S_0$ is the inverse of the product of the numbers $S_1$ to $S_k$. When this calculation is completed, the value of $S_0$ is stored in the memory M. At this point the precalculation means can be disconnected from the calculation means 13 because the values of the numbers $S_0$-$S_k$ are stored in the memory M. The calculation unit includes a random number generator Ga for generating random numbers on k+1 bits and connected to a register 14 for containing a random number e on k+1 bits. At the beginning of the calculation process, the generator Ga writes the random number into the register 14.

The memory M is connected to a selector $SE_1$ whose output is connected to one input of a multiplier Mu. A selector $SE_2$ has its output connected to the other input of the multiplier Mu. The output of the multiplier is connected to an input of a router AI which has two outputs connected to respective inputs of two registers 16, 18 in which are written two variables x and y which are the results of products of numbers from the series $S_0$-$S_k$. The two outputs of the registers x and y are looped to the two inputs of the selector $SE_2$. Reading the register 14 bit by bit controls the setting of both the selector $SE_2$ and the router AI.

To be more precise, the bits $e_0 \ldots e_i \ldots e_k$ of the register 14 are scrutinized on each iteration and if the bit $e_i$ concerned is equal to 1, then the selector $SE_2$ connects the output of the register 16 to an input of the multiplier Mu and the router AI connects the output of the multiplier Mu to the input of the register 16. Similarly, if $e_i$ is equal to 0, then the selector $SE_2$ connects the output of the register 18 to the input of the multiplier Mu and the router AI connects the output of the multiplier Mu to the input of the register 18.

In parallel with this, on each iteration, the selector $SE_1$ sends the numbers $S_0$-$S_k$ to the other input of the multiplier Mu in succession, one-by-one.

Consequently, on each iteration, the content of a register 16 or 18 (depending on the value of $e_i$) is multiplied by a number $S_i$ and the result is written into the same register, overwriting the preceding value. When all the numbers $S_0$-$S_k$ have been processed, the registers 16 and 18 contain two numbers which are the inverse of each other modulo N.

Figure 3:
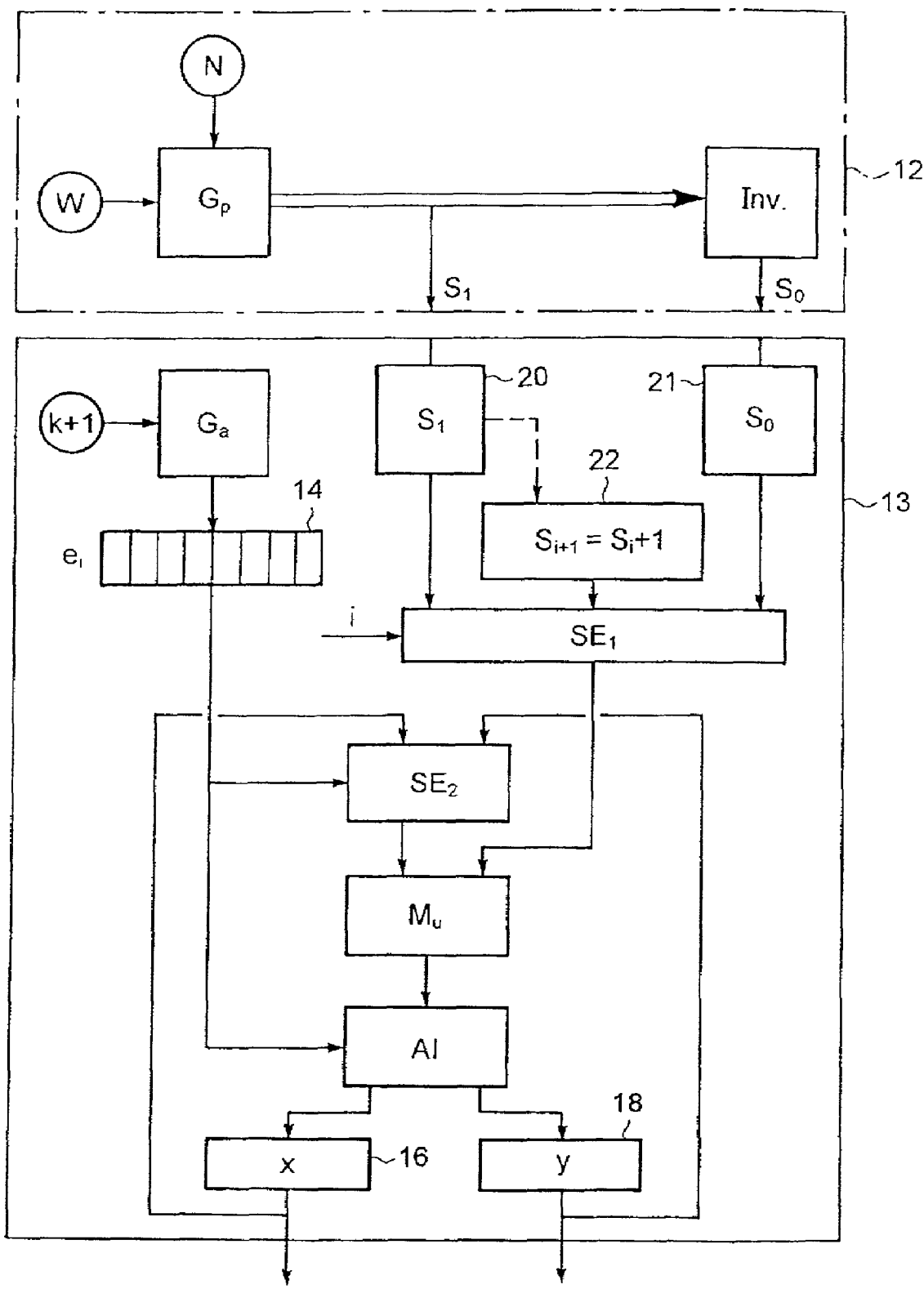
FIG. 3 is a block diagram of another embodiment of a calculation unit according to the invention.

FIG. 3 shows an embodiment that differs from the FIG. 2 embodiment essentially in how the numbers $S_i$ are obtained. Overall, the precalculation means 12 are identical to those of the FIG. 1 embodiment, i.e. they essentially include a generator for generating numbers that are prime with said large number N and a circuit Inv for generating the number $S_0$ from the numbers $S_1$-$S_k$.

However, in this example the number N is a chosen prime number. Consequently, any series of consecutive numbers $S_i$ is a series of numbers that are prime with N. It is therefore possible to define a fast execution function that simply obtains one of the numbers by adding 1 to the number $S_i$ previously obtained, as follows:

$$S_{i+1}=S_i+1$$

In this case, the smallest number $S_1$ of said set is any chosen number.

There is therefore no need for the set of numbers $S_i$ determined by the precalculation means 12 to be transferred and stored for use by the calculation means 13. It is simply sufficient to store the smallest number $S_1$ of said set and the number $S_0$ calculated by the circuit Inv.

Given that these two numbers are stored in two registers 20, 21 of the calculation means 13, it is sufficient to add means 22 for applying a fast execution function, here the function $S_{i+1}=S_i+1$, to the calculation means.

Under these conditions, the selector $SE_1$ is connected to the output of the means 22 and to the outputs of the two registers 20 and 21. In other words, in the series of numbers $S_0 \ldots S_k$, only the numbers $S_0$ and $S_1$ are read in the registers and all the others, from $S_2$ to $S_k$, are calculated in real time by the means 22. It appears that obtaining the greater part of the numbers $S_i$ by fast calculation of the kind indicated above saves time compared to the preceding embodiment, which entails reading each number in a memory.

Apart from the means connected to the selector $SE_1$, the remainder of the calculation means 13 is identical to the FIG. 2 embodiment, and for this reason is not described in detail again. Its functioning is also identical provided that the selector $SE_1$ is capable, on each iteration of the calculation, of "presenting" the successive numbers $S_i$ to the corresponding input of the multiplier Mu.

It should be noted that the FIG. 3 embodiment can also be satisfactory even if the number N is not a prime number. In this case, it is generally possible to determine a succession of k consecutive integers that are all prime with the number N.

This condition will be met in particular if the smallest prime factor of N (denoted p) is greater than $S_1+(k-1)$.

In this case, since p is a prime number, the sequence $S_1$, $S_1+1, \ldots S_1+k-1$ is formed of k consecutive integers that are prime with p, and therefore prime with N. In this case, the means 20 for applying the fast execution function as already described can be used, i.e. the function:

$$S_{i+1}=S_i+1$$

If the above condition is not satisfied, in other words if $p \leq S_1+(k-1)$, $S_1$ is chosen to be prime with p since p is prime and, each time, 1 is added to $S_i$. A test is executed to determine if the number obtained is prime with p and only numbers that are prime with p are retained. In this case there is obtained, instead of a series of consecutive numbers, a number of groups of consecutive numbers, all prime with N. It is then sufficient to modify accordingly the definition of the fast execution function to be able to recalculate in real time the set of numbers $S_2$ to $S_k$, whenever necessary.

More generally, whenever it is possible to define a fast execution function from a judicious selection of the numbers prime with N delivered by the generator Gp, an embodiment of the kind described with reference to FIG. 3 can be used.

It should further be noted that it is advantageous to choose the numbers in said series from smaller numbers that are all prime with and less than said large number N. To give an idea of the order of magnitude concerned, said large number N can be a binary number on 163 bits, the number w can be a binary number on 32 bits and k can be equal to 160.

The invention claimed is:

1. A calculation device comprising:
a cryptographic apparatus configured to execute at least one part of a cryptographic protocol including determining the inverse of an integer modulo a large number N, which apparatus includes:
a precalculation circuit comprising
a generator for generating a series of binary numbers $S_l$ to $S_k$ that are prime with and less than said large number N, a number from said series being the inverse of the product of the others modulo said large number, and
a circuit for precalculating a number $S_0$ defined as $$S_0 = \left( \prod_{l=1}^{k} S_l \right)^{-1}$$

modulo N; and
a calculation unit comprising:
a memory for storing the number $S_0$ received from said circuit for precalculating,
means for dividing all the numbers of said series $S_l$ to $S_k$ into two groups at random, and
means for multiplying the numbers of each group, the results of such multiplying constituting two required numbers that are the inverse of each other modulo the large number N, said means for multiplying the numbers of each group are constructed so as to calculate the products of the numbers of each group from the at least one of the binary numbers stored, and
means for outputting the results of the multiplying to be used in said cryptographic protocol; and
said cryptographic device further comprising:
means for the cryptographic protocol using the results output by the means for outputting.

2. The cryptographic device claimed in claim 1, wherein said calculation unit includes:
means for generating a random number,
a register for storing said generated random number,
means for representing two of the required numbers the value of said two required numbers being initialized to 1,
means for selecting bits of said random number one-by-one and a corresponding number from said series, and
means for multiplying the current value of one of the required two numbers by said corresponding number if said bit is equal to 0 or for multiplying the current value of the other of the required two numbers by said corresponding number if said bit is equal to 1, the result of said multiplication constituting the new current value of one or the other of the required two numbers, respectively, and the above operations being effected for all the aforementioned selections, the final current values contained in said multiplying means representing two numbers constituting the required two numbers that are the inverse of each other modulo the large number N.

3. The cryptographic device claimed in claim 1, wherein said for precalculation means include means for determining a set of numbers that are prime with said large number, said set constituting numbers of said series, and means for determining the inverse of the product of the numbers of said set modulo said large number, said inverse constituting a number from said series.

4. The cryptographic device claimed in claim 1, wherein said means for multiplying said series include means for storing the numbers thereof.

5. The cryptographic device claimed in claim 3, wherein said means for multiplying said series include means for generating some numbers of said series in real time, from the at least one of the binary numbers stored.

6. The cryptographic device claimed in claim 5, wherein said memory contains the smallest number of said set of numbers and the inverse of the product of the numbers of said set modulo said large number, and wherein said generator includes adding means implementing a fast execution function for obtaining a succession of numbers constituting said set successively, starting from said smallest number, said series being formed by the numbers of said succession of numbers and said inverse of the product of the numbers of said set modulo said large number.

7. The cryptographic device claimed in claim 6, wherein said fast execution function obtains each number of said succession of numbers by adding 1 to the preceding number.

8. The cryptographic device claimed in claim 7, wherein said large number is a chosen prime number and said smallest number of said set contained in said storage means is any chosen number.

9. The cryptographic device claimed in claim 7, wherein said large number is any chosen number and said smallest number of said set is the smallest number of a set of consecutive numbers obtained by said fast execution function, said consecutive numbers being chosen in a range of consecutive integers all of which are prime with said large number.

10. The cryptographic device according to claim 1, wherein said cryptographic protocol is a DSA cryptographic protocol.

11. The cryptographic device according to claim 1, wherein said cryptographic protocol is an ECDSA cryptographic protocol.

* * * * *